US011099354B2

(12) United States Patent
Deschauer et al.

(10) Patent No.: US 11,099,354 B2
(45) Date of Patent: Aug. 24, 2021

(54) OPTICAL LENS SYSTEM AND IMAGING SYSTEM (71) Applicant: Leica Camera AG, Wetzlar (DE)

(72) Inventors: Marcus Deschauer, Munich (DE); Achim Zirkel, Munich (DE); Jakob Bleicher, Munich (DE); Stephan Albrecht, Cologne (DE)

(73) Assignee: Leica Camera AG, Wetzlar (DE)

( * ) Notice: Subject to any disclaimer, the term of this patent is extended or adjusted under 35 U.S.C. 154(b) by 173 days.

(21) Appl. No.: 16/406,877

(22) Filed: May 8, 2019

(65) Prior Publication Data
US 2019/0377159 A1    Dec. 12, 2019

(30) Foreign Application Priority Data

May 15, 2018    (DE) .......................... 102018111669.1

(51) Int. Cl.
*G02B 9/34* (2006.01)
*G02B 13/00* (2006.01)

(52) U.S. Cl.
CPC ............. *G02B 9/34* (2013.01); *G02B 13/004* (2013.01); *G02B 13/008* (2013.01)

(58) Field of Classification Search
CPC ...... G02B 9/34; G02B 13/008; G02B 13/004; G02B 13/18; G02B 3/04
USPC ............... 359/642, 708, 715, 771, 772, 780
See application file for complete search history.

(56) References Cited

U.S. PATENT DOCUMENTS

| 7,274,518 | B1 | 9/2007 | Tang et al. |
| 9,244,251 | B2 | 1/2016 | Choi et al. |
| 2010/0309367 | A1 | 12/2010 | Iba et al. |
| 2012/0236421 | A1* | 9/2012 | Tsai .......................... G02B 9/34 359/780 |
| 2014/0184880 | A1 | 7/2014 | Ahn et al. |
| 2015/0168680 | A1 | 6/2015 | Shih |
| 2015/0168691 | A1 | 6/2015 | Lee |
| 2015/0277087 | A1 | 10/2015 | Karbe et al. |
| 2016/0070086 | A1 | 3/2016 | Martin |

FOREIGN PATENT DOCUMENTS

| DE | 10 2014 104 457 B3 | 2/2015 |
| EP | 2 993 512 A1 | 3/2016 |

OTHER PUBLICATIONS

German Search Report dated Jan. 17, 2019 in corresponding German Patent Application No. 10 2018 111 669.1 (two pages).

* cited by examiner

*Primary Examiner* — Marin Pichler
*Assistant Examiner* — Alberto J Betancourt
(74) *Attorney, Agent, or Firm* — Kilpatrick Townsend & Stockton LLP (57) ABSTRACT The present invention relates to an optical lens system for a camera comprising in an order from an end at the object side to an end at the image side a first lens having a positive refractive power, a second lens having a positive refractive power, a third lens having a positive refractive power, and a fourth lens having a negative refractive power, wherein the second and third lenses are each designed as meniscus lenses, wherein the surface of the second lens at the object side is convex and the surface of the third lens at the object side is concave. The invention further relates to an imaging system having an image sensor that has a plurality of light-sensitive elements arranged in rows and columns and having such an optical lens system.

18 Claims, 5 Drawing Sheets

OPTICAL LENS SYSTEM AND IMAGING SYSTEM

This application claims priority to German Patent Application No. 102018111669.1, filed May 15, 2018, the disclosure of which is incorporated by reference herein.

The present invention relates to an optical lens system for a camera.

Technical developments have had the result that mobile devices such as cellphones, in particular so-called smartphones, or portable computers, in particular so-called tablet computers, are typically equipped with a camera or even with a plurality of cameras. Increasing miniaturization that also results in ever smaller image sensors also requires lens systems or objectives having a compact design.

An innovative equipment feature of the above-named mobile devices is the equipping with a 3D imaging system so that three-dimensional images, i.e. images that also comprise depth information in addition to the lateral image information, can be generated. An approach for generating three-dimensional images comprises using a 3D image sensor having an upstream objective or lens system that generates a depth image of the scene, with the depth information being acquired using the time of flight (TOF) process. Such 3D image sensors are also called TOF sensors. An example for a TOF sensor is a photonic mixing detector also called a PMD sensor (PMD=photonic mixing device). To acquire the depth information, the scene to be recorded is illuminated by a light pulse whose wavelength is typically in the infrared range and the depth-dependent time of flight of this light pulse is determined with spatial resolution by the 3D image sensor. To generate a polychromatic 3D image, a polychromatic 2D image of a scene generated by a 2D image sensor, in particular by a high-resolution 2D image sensor, and the associated 3D image generated by the 3D image sensor can be applied against one another.

The objective or lens system arranged upstream of the image sensor has to have a high lens speed and simultaneously a large depth of field for a high-quality three-dimensional imaging system, wherein the design should additionally be as compact as possible.

However a high lens speed and a high depth of field represent contradictory demands on such an objective. Conventional lens systems or objectives therefore typically have a relatively low lens speed to satisfy the demand for a large depth of field. Lens systems that have a higher lens speed comprise more than four lenses and therefore do not satisfy the demands on a design that is as compact as possible.

Lens systems having four lenses are known from U.S. Pat. No. 7,274,518 B1 and US 2010/0309367 A1, wherein there are provided in an order from an end at the object side to an end at the image side a first lens having a positive refractive power, a second lens having a negative refractive power, a third lens having a positive refractive power, and a fourth lens having a negative refractive power. A lens system having four lenses is known from document US 2014/0184880 A1 in which the first three lenses have a positive refractive power and the fourth lens has a negative refractive power.

It is the object of the present invention to provide a lens system that simultaneously has high lens speed, high depth of field, and a compact design.

It is solved by an optical lens system having the features of claim 1. The optical lens system for a camera in accordance with the present invention comprises exactly four lenses, wherein there are provided in an order from an end at the object side to an end at the image side a first lens having a positive refractive power, a second lens having a positive refractive power, a third lens having a positive refractive power, and a fourth lens having a negative refractive power, wherein the second and third lenses are each designed as meniscus lenses, wherein the surface of the second lens at the object side is convex and the surface of the third lens at the object side is concave, and wherein a radius of curvature L2R1 of the surface of the second lens at the object side and a radius of curvature L3R2 of the surface of the third lens at the image side satisfy the condition $-1.4<L2R1/L3R2<-0.7$, in particular $-1.2<2R1/L3R2<-0.8$, and a radius of curvature L2R2 of the surface of the second lens at the image side and a radius of curvature L3R1 of the surface of the third lens at the object side satisfy the condition $-1.8<L2R2/L3R1<-1.0$, in particular $-1.6<L2R2/L3R1<-1.2$. The lenses are advantageously arranged along an optical axis, with said order relating to the direction of propagation of light along the optical path of the lens system from an object side to an image side of the lens system. A beam-limiting aperture diaphragm can be arranged in the region of the first lens, with the aperture diaphragm being able to be located within or in front of the focal plane of the first lens. A planoparallel plate can furthermore be arranged behind the fourth lens, with the planoparallel plate being able to configured as a band-elimination filter. The characteristics of this band-elimination filter can be configured as a low pass filter, as a high pass filter or as a band pass filter, with the band-elimination filter in particular being able to be permeable for infrared light and blocking for visible light. A meniscus lens is understood as a lens whose one surface is convexly curved and whose other surface is concavely curved.

The refractive index of each lens is advantageously higher than 1.6, at least in a wavelength range between 800 and 1000 nm. The lenses can be manufactured either from optical glass or from plastic, e.g. from polymethylmethacrylates (PMMA), polycarbonates, polystyrenes, cycloolefin (co)polymers, or other suitable plastics. The use of high-index materials for the lenses produces smaller angles of incidence on the lens surfaces in comparison with lens materials having a lower refractive index so that aberrations can be reduced.

Unlike lens systems in accordance with the prior art in which lenses having alternatingly positive and negative refractive powers are typically arranged behind one another, the lens system in accordance with the invention has a high lens speed with simultaneously an extremely compact design. Only the fourth lens in the lens system in accordance with the invention has a negative refractive power to in particular be able to correct image field curvature and distortion.

The use of meniscus lenses as carriers of the positive refractive power at least with the second and third lenses reduces sensitivity to production tolerances in comparison with biconvex lenses, in particular with respect to surface tolerances or adjustment tolerances such as tilting tolerances or centering tolerances. It thereby becomes possible also to produce the lens system in accordance with the invention with a small f-stop and compact dimensions with a justifiable effort in high and reproducible quality.

Due to said condition for the radius of curvature L2R1 of the surface of the second lens at the object side and for the radius of curvature L3R2 of the surface of the third lens at the image side, the second and third lenses together form an approximately symmetrical "air lens", whereby a correction of asymmetrical artifacts such as coma and distortion is made possible.

Due to said condition for the radius of curvature L2R2 of the surface of the second lens at the image side and for the radius of curvature L3R1 of the surface of the third lens at the object side, the mutually facing surfaces of the second and third lenses likewise still have a certain symmetry that has, however, been a little weakened here due to the asymmetrical optical path.

The lens system in accordance with the invention is particularly suitable for use with narrow-band light, in particular monochrome light, in particular infrared light. It is possible in this respect to dispense with the correction of chromatic aberrations that as a rule requires the use of different lens materials and lenses having a negative refractive power. The lens system or objective in accordance with the invention is therefore in particular suitable for use with a 3D image sensor, in particular with a 3D TOF image sensor.

In accordance with an advantageous embodiment of the invention, each lens has at least one aspherically curved surface. Both surfaces of each lens are preferably aspherically curved. The aspherical curvature of at least one lens surface supports the aim of the present invention of maximizing the lens speed, the depth of field range, and the compactness.

In accordance with a particularly advantageous embodiment of the invention, the lens system has spherical aberrations that are dimensioned such that they at least partly compensate a blur caused by defocus of an image of an object produced by the lens system. Unlike conventional lens systems, spherical aberrations are therefore at least not completely corrected away, but are rather introduced in a targeted manner such that blur can be compensated by these spherical aberrations that is due to a scene extending over a wide depth zone and parts of a recorded scene are thus not in the focus of the lens system.

Such an aberration on the image side of the lens system that is called defocus is therefore a result of different object distances on the object side of the lens system and can in particular hardly be avoided with objects having a large depth zone in said application in 3D imaging systems. As a rule, the aim is that a predefined object distance zone that can e.g. extend from infinity up to 1 m, preferably up to 0.5 m, particularly preferably up to 0.25 m, can be imaged with an acceptable image sharpness. Said part compensation is in particular understood such that the radius of a circle of confusion at the image side for an object point that is in particular axial, i.e. that lies on the optical axis, and that is located inside the aforesaid object distance zone is no larger than 12 µm. The radius of a circle of confusion at the image side is in particular understood in connection with this text as the radius determined in accordance with the method of the RMS (=root mean square), i.e. the RMS spot radius. The RMS spot radius is as a rule smaller than a geometrically determined radius of the circle of confusion that can comprise all the rays emanating from the object point, i.e. also rays lying very far outside. Objects or scenes whose object points are located within the predefined object distance zone can thus be imaged in the image plane or on an image senor arranged there with a still acceptable image sharpness with the aid of the lens system.

The first lens is also advantageously configured as a meniscus lens.

In accordance with a further advantageous embodiment of the invention, the refractive power of the second lens is greater than the refractive power of the first and third lenses. The second lens thus has the highest refractive power in the lens system. A further reduction of the sensitivity with respect to production tolerances, in particular with respect to the aforesaid production tolerances, is thereby achieved.

The refractive power of the first lens is advantageously smaller than the refractive power of the second and third lenses. The sensitivity with respect to production tolerances, in particular with respect to the aforesaid production tolerances is hereby likewise reduced. A higher refractive power namely results in a greater deflection of the incident light rays and thus in a higher sensitivity with respect to production tolerances, with in this respect lenses that are arranged closer to an aperture diaphragm being more sensitive due to an accompanying greater illumination.

In accordance with a further advantageous embodiment, the focal length f1 of the first lens and the total focal length f of the lens system satisfy the condition $4.0 < f1/f =< 6.5$.

It has furthermore been found to be advantageous if the focal length f2 of the second lens and the total focal length f of the lens system satisfy the condition $1.0 < f2/f < 2.0$.

In accordance with an even further advantageous embodiment, the focal length f3 of the third lens and the total focal length f of the lens system satisfy the condition $2.0 < f3/f =< 3.5$.

It has furthermore been found to be advantageous if the focal length f4 of the fourth lens and the total focal length f of the lens system satisfy the condition $-12.0 < f4/f < -6.0$.

Finally, it has likewise been found to be advantageous if the common focal length f23 of the second and third lenses and the total focal length f of the lens system satisfy the condition $0.9 < f23/f < 1.3$.

An advantageous balancing of the respective refractive power of the lens with respect to the sensitivity with respect to production tolerances, in particular with respect to the aforesaid production tolerances, is achieved by said conditions for the ratio of the focal lengths of a respective lens with respect to the total focal length of the lens system.

The second and third lenses advantageously make the largest contribution to the total refractive power of the lens system. The common focal length f23 of the second and third lenses thus approximately corresponds to the total focal length of the lens system.

In accordance with an even further advantageous embodiment, the surface of the first lens at the object side is convex. The surface of the first lens at the image side is preferably concave.

The installation length L and the total focal length f of the lens system advantageously satisfy the condition $L/f < 1.1$ The installation length L is understood as the distance between the vertices of the surface of the first lens at the object side and the surface of the fourth lens at the image side. The compactness of the lens system in accordance with the invention can be characterized by the indication of such a ratio between the installation length and the total focal length independently of its total focal length since the focal length of the lens system is ultimately scalable.

All the lenses are advantageously arranged at fixed distances from one another and are not displaceable relative to one another. The lens system accordingly has a fixed focal length and is not configured as a zoom objective.

Provision is made in accordance with a further advantageous embodiment of the invention that the lens system has a wavefront aberration W(p, A) at one point of the exit pupil that is described by a sum of orthogonal Zernike Fringe polynomials $P_i(p, A)$ and associated coefficients $Z_i$ (also written as "Zi"") in the form $$W(p, A) = \sum_{i=1}^{37} Z_i \cdot P_i(p, A)$$

where p is the normed pupil height and A is the azimuthal angle, with the defocus being described by the coefficient Z4 and the polynomial $2p^2-1$; the 3rd order spherical aberration by the coefficient Z9 and the polynomial $6p^4-6p^2+1$; the 5th order spherical aberration by the coefficient Z16 and the polynomial $20p^6-30p^4+12p^2-1$; the 7th order spherical aberration by the coefficient Z25 and the polynomial $70p^8-140p^6+90p^4-20p^2+1$; the 9th order spherical aberration by the coefficient Z36 and the polynomial $252p^{10}-630p^8+560p^6-210p^4+30p^2-1$; and the 11th order spherical aberration by the coefficient Z37 and the polynomial $924p^{12}-2772p^{10}+3150p^8-1680p^6+420p^4-42p^2+1$; and with at least one of the conditions $$1.0 < \sqrt[4]{Z9^2 + Z16^2 + Z25^2 + Z36^2 + Z37^2}/Z4 < 1.9$$

and $$0.35 < \sqrt[4]{Z26^2 + Z25^2 + Z36^2 + Z37^2}/Z4 < 0.70$$

being satisfied, in particular for an axial picture element and/or for an object at infinity, in particular with both of the conditions being satisfied. The normed pupil height p is dimensionless, while W and Zi are indicated in units of the wavelength. The spherical aberrations become lower by this configuration of the lens system and higher order spherical aberrations are also balanced with respect to the defocus so that a depth of field is achieved that is as large as possible.

The present invention further relates to an imaging system having an image sensor that has a plurality of light-sensitive elements arranged in rows and columns and having an optical lens system in accordance with one of the embodiments explained above. Said image sensor is advantageously a 3D image sensor, in particular a 3D TOF image sensor. The lens system and the image sensor are preferably adapted for infrared light, in particular for narrow-band, in particular monochrome, infrared light, having a wavelength between 800 and 1000 nm. The imaging system can furthermore comprise a transmission light source that is adapted for transmitting light pulses, in particular in the infrared range. The control of the transmission light source can take place via a control unit of the 3D image sensor so that the time of flight of a light pulse can be determined pixel-wise, i.e. spatially resolved separately for every light-sensitive element.

The size of the image sensor and the characteristic parameters of the lens system can be coordinated with one another such that the full angle of view amounts to 66° or more, corresponding to half an angle of view of +/-33° or more in the corners of the image sensor. The f-number is preferably smaller than 1.5.

The principle ray angle, i.e. the angle of incidence of a light ray on the surface of the image sensor relative to the perpendicular, amounts to a maximum of 32° over the total image field. It is thereby ensured that an optimum sensitivity is present even on the use of an image sensor in front of whose light-sensitive elements microlenses are arranged.

The distance between the image sensor and the lens system is advantageously unchangeable. It is thus a fixed-focus imaging system.

In accordance with an advantageous embodiment of the invention, the lens system has spherical aberrations that are dimensioned while taking account of the surface of a light-sensitive element such that the spherical aberrations compensate a blur caused by focus of an image of an object produced by the lens system such that the surface of a light spot that is generated by imaging a beam of rays emanating from an object point on the image sensor within a predefined object distance zone is substantially no larger than the surface of the light-sensitive element. The surfaces of the light spot and of the light-sensitive element can in particular relate to one another such that with a central incidence of the light spot on a light-sensitive element, more than a third, preferably more than half, particularly preferably more than two thirds, of the light energy of the light spot is incident on the light-sensitive element. The aforesaid condition is in particular satisfied for an object distance zone between infinite and 1 m, preferably 0.5 m, particularly preferably 0.25 m.

Alternatively or additionally, the condition according to which said surface of the light spot within a predefined object distance zone is substantially not larger than the surface of the light-sensitive element can by way of example also be satisfied in that the radius of the circle of confusion of the light spot, in particular of the above-explained RMS spot radius, is no greater than 12 µm and the edge length of the light-sensitive element amounts to 14 µm. The blur of the lens system and the pixel size of the image sensor, i.e. the resolution of the image sensor, are thus ideally adapted to one another.

Further advantageous embodiments of the invention result from the dependent claims, from the description and from the drawings.

The invention will be described in the following with reference to embodiments and to the drawings. There are shown.

Components that are the same or similar are provided with the same reference numerals in the Figures.

Figure 1:
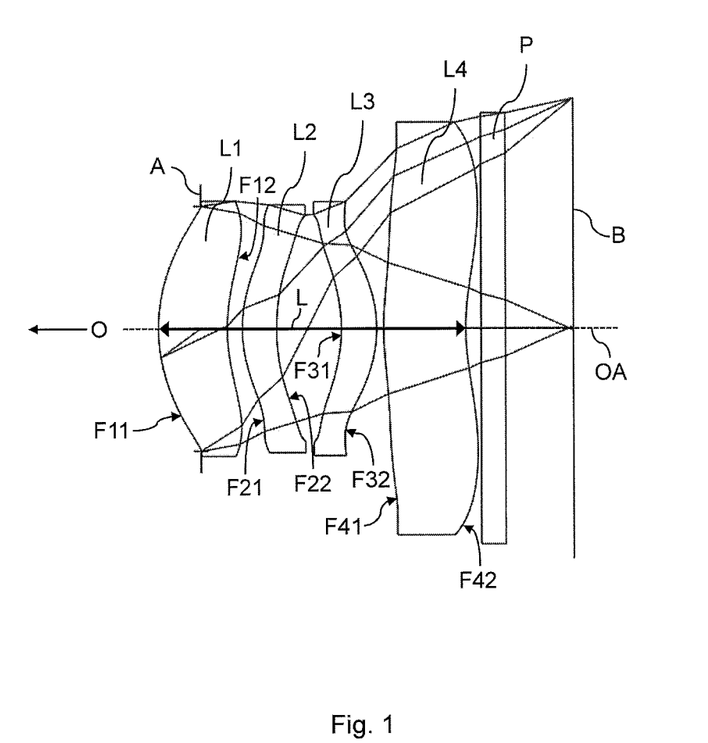
FIG. 1 shows a lens system in accordance with a first embodiment.

FIG. 1 shows an optical lens system having four refractive lens elements In accordance with a first embodiment. An image plane B of the lens system is represented by a vertical line while an object plane O is outside the region of the drawing. The arrangement of the different elements of the lens system in a direction of light propagation of the optical path starting from the object side to the image side is indicated in the following, with relative positional indications such as "in front of" or "behind" relating to this order.

The lens system comprises a first lens L1 having a positive refractive power, a second lens L2 having a positive refractive power, a third lens L3 having a positive refractive power, and a fourth lens L4 having a negative refractive power. The first lens L1 is surrounded by an aperture diaphragm A. A planoparallel plate P is provided as a top/cover glass behind the fourth lens L4. The planoparallel plate P can be configured as a band-elimination filter for visible light so that only infrared light is transmitted.

All the lenses L1 to L4 are configured as meniscus lenses having one convex surface and one concave surface. The first, second, and fourth lenses L1, L2, L4 are arranged such that the surfaces F11, F21, F41 at the object side are convex and the surfaces F12, F22, F42 at the image side are concave. The third lens is arranged in the opposite manner such that the surface F31 at the object side is concave and the surface F32 at the image side is convex.

The lenses L1 to L4 are produced from plastic and have a refractive index of 1.661 and an Abbe number of 20.4. The lens system in accordance with the first embodiment has a total focal length f of 2.62 mm, an f-number of 1.25, an installation length L measured between the vertex of the surface of the first lens L1 at the object side and the vertex of the fourth lens L4 at the image side of 2.66 mm, an image height of 1.97 mm, and half an angle of view of 35.5°.

The planoparallel plate is produced from glass and has a refractive index of 1.523 and an Abbe number of 54.5. All the surfaces of the lenses L1 to L4 are aspherical.

$$z(h) = \frac{h^2/r0}{1+\sqrt{1-(1+k)(h/r0)^2}} + a4 \cdot h^4 + a6 \cdot h^6 + \ldots + a16 \cdot h^{16}$$

applies to a sag z of a respective lens surface in parallel with the optical axis OA at a point having a height h relative to the optical axis OA and perpendicular thereto, where r0 is the vertex radius of curvature, k is the conical constant, and a4, a6, ..., a16 are the aspherical coefficients.

The corresponding structural data of the lens system in accordance with the first embodiment are given in Table 1, with the surfaces present in the lens system being consecutively numbered from 0 to 12 according to their order. The association with the different elements of the lens system results from the table, with the surface at the object side being indicated first and subsequently the surface at the image side for every lens L1 to L4 and with the corresponding reference numerals of FIG. 1 additionally being listed in brackets. The thickness d indicates the spacing of a respective surface from the following surface. The radius r0, the thickness d, and the focal length are each given in mm. The conical constant k is equal to zero for all the lenses L1 to L4.

TABLE 1

| Surface | Element | Radius r0 | Thickness d | Material | Index | Abbe # | Focal length |
|---|---|---|---|---|---|---|---|
| 0 | Object | Plano | ∞ | | | | |
| 1 | Aperture | Plano | −0.366 | | | | |
| 2 (F11) | Lens L1 | 1.421 | 0.595 | Plastic | 1.661 | 20.4 | 11.64 |
| 3 (F12) | | 1.472 | 0.134 | | | | |
| 4 (F21) | Lens L2 | 1.121 | 0.302 | Plastic | 1.661 | 20.4 | 3.69 |
| 5 (F22) | | 1.922 | 0.559 | | | | |
| 6 (F31) | Lens L3 | −1.303 | 0.296 | Plastic | 1.661 | 20.4 | 8.21 |
| 7 (F32) | | −1.135 | 0.059 | | | | |
| 8 (F41) | Lens L4 | 2.447 | 0.712 | Plastic | 1.661 | 20.4 | −29.47 |
| 9 (F42) | | 1.920 | 0.128 | | | | |
| 10 | Top glass | Plano | 0.210 | Glass | 1.523 | 54.5 | |
| 11 | | Plano | 0.590 | | | | |
| 12 | Image | Plano | | Sensor | | | |

The aspherical constants a4, a6, ..., a16 are given in the following in Table 2 for the surfaces 2 to 9 of the lenses L1 to L4.

TABLE 2

| Surface | a4 | a6 | a8 | a10 |
|---|---|---|---|---|
| 2 (F11) | −0.072375119 | 0.11612465 | 0.2111098 | 0.18270985 |
| 3 (F12) | −0.23567085 | −0.098423245 | 0.23908259 | −0.50931788 |
| 4 (F21) | −0.2485888 | 0.35034196 | −1.2113076 | −0.008843515 |
| 5 (F22) | 0.2173257 | −0.46390236 | 0.25516898 | −0.38707056 |
| 6 (F31) | 0.43683291 | −1.3557549 | 2.6451936 | −1.6661149 |
| 7 (F32) | 0.023106241 | 0.45518488 | −1.6958001 | 3.9359768 |
| 8 (F41) | −0.3894922 | 0.43761569 | −0.29996824 | 0.12677858 |
| 9 (F42) | −0.28038751 | 0.15754306 | −0.070084236 | 0.017339992 |

| Surface | a12 | a14 | a16 |
|---|---|---|---|
| 2 (F11) | −0.08073422 | 0 | 0 |
| 3 (F12) | 0.47199749 | −0.15230936 | 0 |
| 4 (F21) | 1.4837768 | −0.76996347 | 0 |
| 5 (F22) | 0.38433529 | 0 | 0 |
| 6 (F31) | 0.14141413 | 0 | 0 |
| 7 (F32) | −3.061051 | 0.38969131 | 0.28545062 |
| 8 (F41) | −0.030379063 | 0.0030922295 | 0 |
| 9 (F42) | −0.001955181 | 0 | 0 |

The lens system in accordance with FIG. 1 has a wavefront aberration W(p, A) for a point of the exit pupil that is described by a sum of orthogonal Zernike Fringe polynomials Pi(p, A) and associated coefficients Zi (or Zi) in the form $$W(p, A) = \sum_{i=1}^{37} Z_i \cdot P_i(p, A)$$

where p is the normed pupil height and A is the azimuthal angle. Accordingly p can adopt values between 0 and 1 and A can adopt values between 0 and $2\pi$. The wavefront aberration Wand accordingly the coefficients $Z_i$ (or $Z_i$) are given in units of the wavelength. The values of the Zernike Fringe coefficients Z1 to Z37 and the associated polynomials $P_i$ are given in Table 3 for an axial image point and for an object at infinity.

TABLE 3

| | | |
|---|---|---|
| Z 1 | −0.57920179 | 1 |
| Z 2 | 0.00000000 | (p) * COS (A) |
| Z 3 | 0.00000000 | (p) * SIN (A) |
| Z 4 | −0.16329097 | (2p^2 − 1) |
| Z 5 | 0.00000000 | (p^2) * COS (2A) |
| Z 6 | 0.00000000 | (p^2) * SIN (2A) |
| Z 7 | 0.00000000 | (3p^2 − 2) p * COS (A) |
| Z 8 | 0.00000000 | (3p^2 − 2) p * SIN (A) |
| Z 9 | 0.54962059 | (6p^4 − 6p^2 + 1) |
| Z 10 | 0.00000000 | (p^3) * COS (3A) |
| Z 11 | 0.00000000 | (p^3) * SIN (3A) |
| Z 12 | 0.00000000 | (4p^2 − 3) p^2 * COS (2A) |
| Z 13 | 0.00000000 | (4p^2 − 3) p^2 * SIN (2A) |
| Z 14 | 0.00000000 | (10p^4 − 12p^2 + 3) p * COS (A) |
| Z 15 | 0.00000000 | (10p^4 − 12p^2 + 3) p * SIN (A) |
| Z 16 | −0.04107681 | (20p^6 − 30p^4 + 12p^2 − 1) |
| Z 17 | −0.00009667 | (p^4) * COS (4A) |
| Z 18 | 0.00000000 | (p^4) * SIN (4A) |
| Z 19 | 0.00000000 | (5p^2 − 4) p^3 * COS (3A) |
| Z 20 | 0.00000000 | (5p^2 − 4) p^3 * SIN (3A) |
| Z 21 | 0.00000000 | (15p^4 − 20p^2 + 6) p^2 * COS (2A) |
| Z 22 | 0.00000000 | (15p^4 − 20p^2 + 6) p^2 * SIN (2A) |
| Z 23 | 0.00000000 | (35p^6 − 60p^4 + 30p^2 − 4) p * COS (A) |
| Z 24 | 0.00000000 | (35p^6 − 60p^4 + 30p^2 − 4) p * SIN (A) |
| Z 25 | 0.06376645 | (70p^8 − 140p^6 + 90p^4 − 20p^2 + 1) |
| Z 26 | 0.00000000 | (p^5) * COS (5A) |
| Z 27 | 0.00000000 | (p^5) * SIN (5A) |
| Z 28 | −0.00013088 | (6p^2 − 5) p^4 * COS (4A) |
| Z 29 | 0.00000000 | (6p^2 − 5) p^4 * SIN (4A) |
| Z 30 | 0.00000000 | (21p^4 − 30p^2 + 10) p^3 * COS (3A) |
| Z 31 | 0.00000000 | (21p^4 − 30p^2 + 10) p^3 * SIN (3A) |
| Z 32 | 0.00000000 | (56p^6 − 105p^4 + 60p^2 − 10) p^2 * COS (2A) |
| Z 33 | 0.00000000 | (56p^6 − 105p^4 + 60p^2 − 10) p^2 * SIN (2A) |
| Z 34 | 0.00000000 | (126 p^8 − 280p^6 + 210p^4 − 60p^2 + 5) p * COS (A) |
| Z 35 | 0.00000000 | (126 p^8 − 280p^6 + 210p^4 − 60p^2 + 5) p * SIN (A) |

TABLE 3-continued

| | | |
|---|---|---|
| Z 36 | 0.07678453 | (252p^10 − 630p^8 + 560p^6 − 210p^4 + 30p^2 − 1) |
| Z 37 | −0.13813242 | (924p^12 − 2772p^10 + 3150p^8 − 1680p^6 + 420p^4 − 42p^2 + 1) |

It is noted that the Zernike Fringe coefficients $Z_i$ were calculated with the aid of numerical processes. Although a value different from zero is only to be expected in principle for an axial image point for the coefficients Z1, Z4, Z9, Z16, Z25, Z36, and Z36 due to the rotationally symmetrical design of the lens system, some further coefficients different from zero, namely the coefficients Z17 and Z18 can be found in Table 3 and in the corresponding Table 6. Their values are, however, some orders of magnitude smaller than the value of the aforesaid rotationally symmetrical coefficients. These values are due to calculation inaccuracies, in particular rounding inaccuracies.

Figure 2:
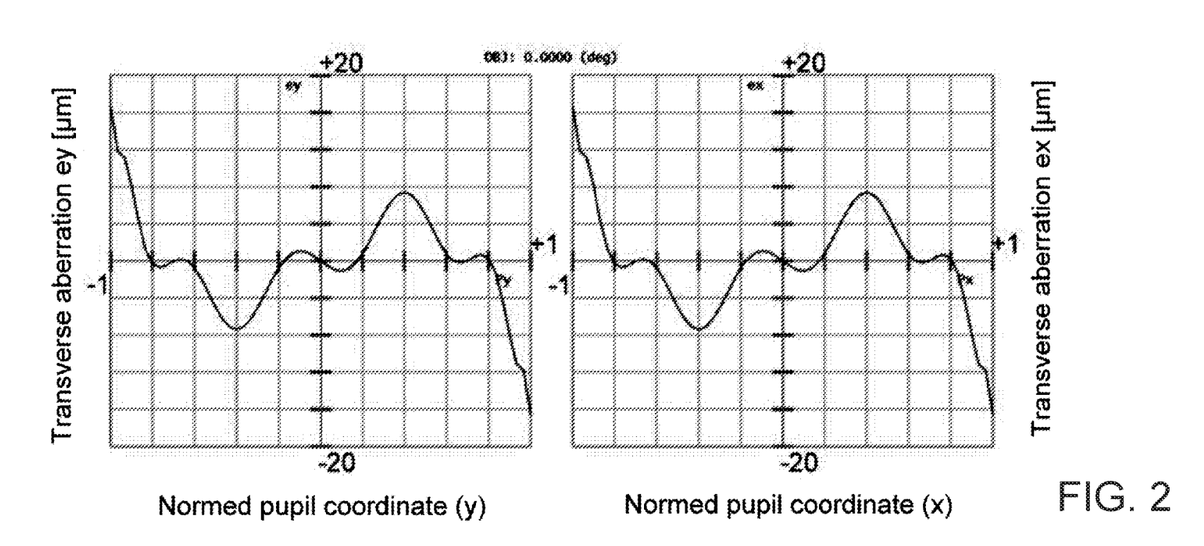
FIG. 2 shows the transverse aberrations ex, ey (in µm) for the normed pupil coordinates in the x and y directions.

The transverse aberrations ex, ey are shown (in μm) for the normed pupil coordinates in the x and y directions in FIG. 2.

Figure 3A:
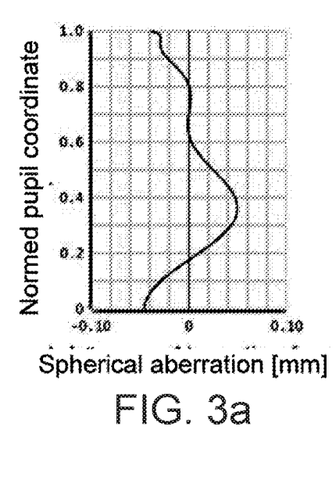
FIG. 3*a* shows the spherical aberration is shown (in mm) in dependence on the normed pupil coordinate.
Figure 3B:
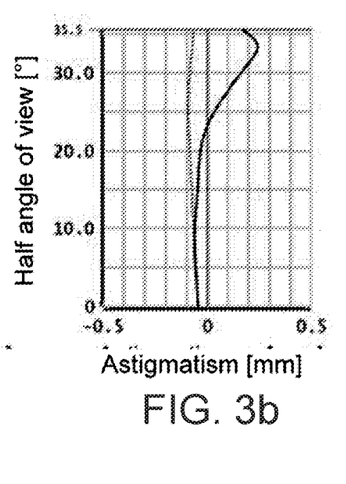
FIG. 3*b* shows the astigmatism is in dependence on half the angle of view (in degrees)
Figure 3C:
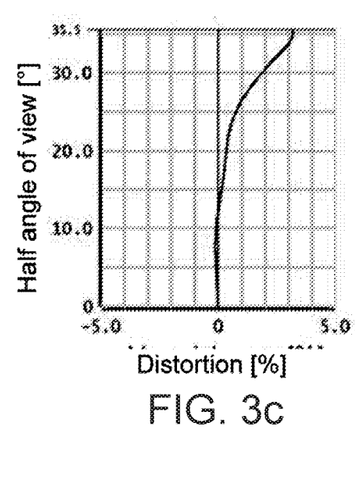
FIG. 3*c* shows the distortion (in percent) in dependence on half the angle of view (in degrees)

The spherical aberration is shown (in mm) in dependence on the normed pupil coordinate in FIG. 3a; the astigmatism is shown (in mm) in dependence on half the angle of view (in degrees) in FIG. 3b; and the distortion is shown (in percent) in dependence on half the angle of view (in degrees) in FIG. 3c.

Figure 4:
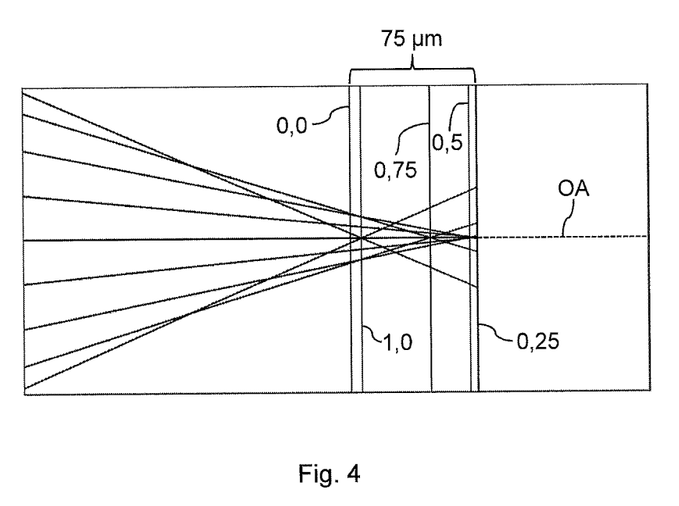
FIG. 4 shows diagrams of the transverse aberrations of the lens system of FIG. 1.

Different rays having a normed pupil height of 0, 0.25, 0.5, 0.75, and 1 that intersect at different planes of intersection are shown in FIG. 4. The planes of intersection are shown by vertical lines that are numbered by the associated pupil coordinate. The planes of intersection are located within a focal length zone of 75 μm. It must be noted that an actual point of intersection cannot be recognized for a pupil height of 0 since the associated rays are located infinitesimally close to the optical axis OA.

Figure 5:
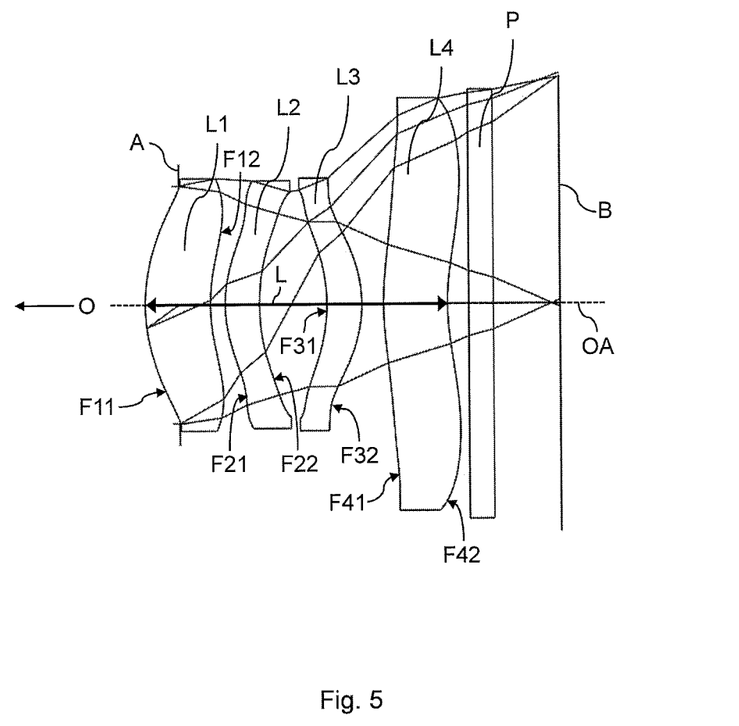
FIG. 5 shows a lens system in accordance with a second embodiment.
Figure 6:
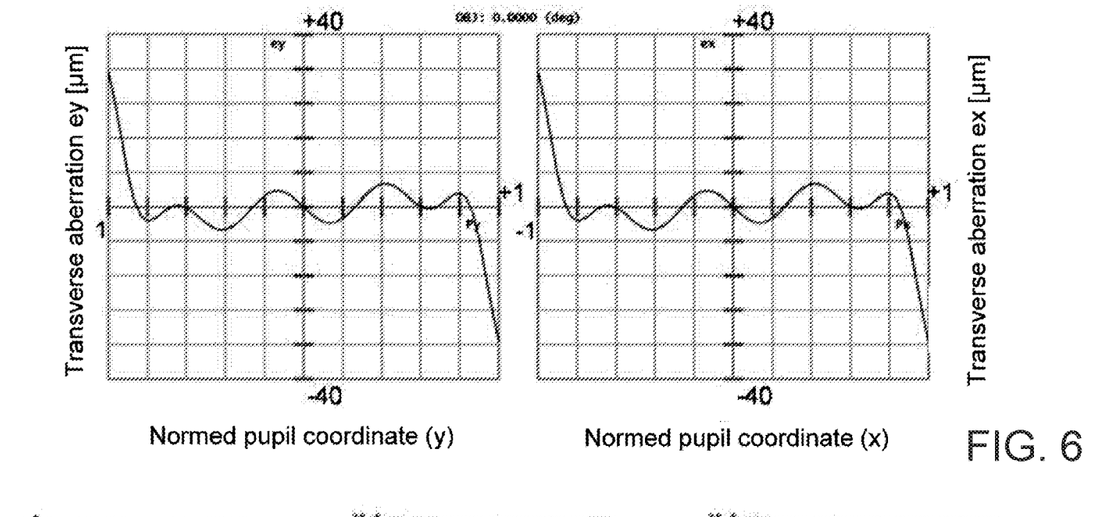
FIG. 6 shows diagrams of the transverse aberrations of the lens system of FIG. 5.
Figure 7A:
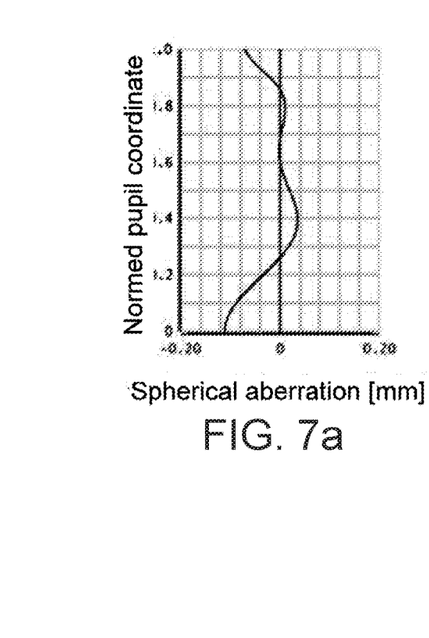
FIGS. 7*a*, 7*b* and 7*c* show the spherical aberration (7*a*), the astigmatism (7*b*), and the distortion (7*c*) for the lens system of FIG. 5.
Figure 7B:
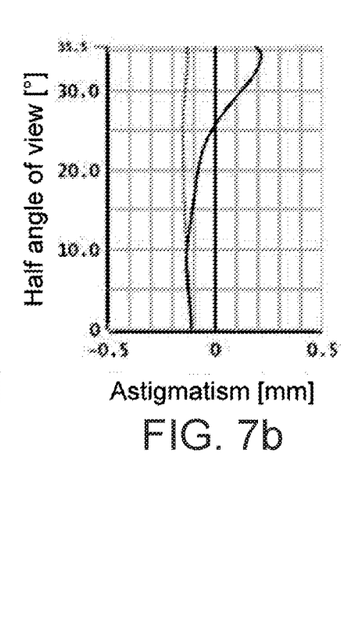
Figure 7C:
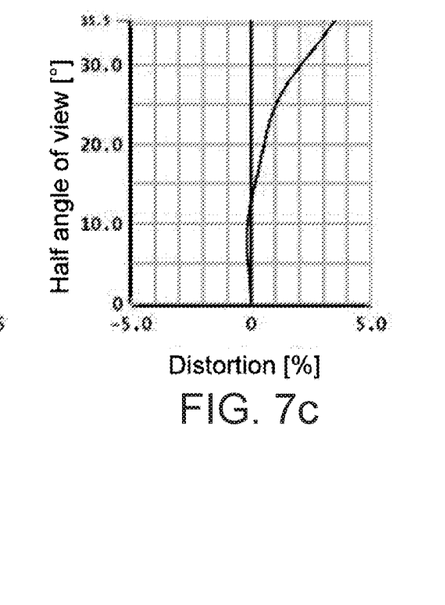

A lens system in accordance with a second embodiment of the invention is shown in FIG. 5. Since the constructive embodiment of the lens system of FIG. 5 does not differ from the design embodiment of the lens system of FIG. 1, reference is made to the corresponding description with respect to FIG. 1 in this respect.

Differing from the embodiment in accordance with FIG. 1, the lenses L1 to L4 are produced from glass and have a refractive index of 1.743 and an Abbe number of 49.3. The lens system in accordance with FIG. 5 has a total focal length f of 2.54 mm, an f-number of 1.25, an installation length of 2.61 mm, an image height of 1.97 mm, and half an angle of view of 35.5°.

The corresponding structural data of the lens system of FIG. 5 are indicated in Table 4 and the associated aspherical coefficients a4, a6, . . . , a16 are indicated in Table 5, with the values and their units corresponding to the indications in Tables 1 and 2. The conical constant k is equal to zero for all the lenses L1 to L4.

TABLE 4

| Surface | Element | Radius r0 | Thickness d | Material | Index | Abbe # | Focal length |
|---|---|---|---|---|---|---|---|
| 0 | Object | Plano | ∞ | | | | |
| 1 | Aperture | Plano | −0.293 | | | | |
| 2 (F11) | Lens L1 | 1.516 | 0.566 | Glass | 1.743 | 49.3 | 15.34 |
| 3 (F12) | | 1.477 | 0.128 | | | | |
| 4 (F21) | Lens L2 | 1.128 | 0.297 | Glass | 1.743 | 49.3 | 3.36 |
| 5 (F22) | | 1.855 | 0.583 | | | | |
| 6 (F31) | Lens L3 | −1.364 | 0.301 | Glass | 1.743 | 49.3 | 6.16 |
| 7 (F32) | | −1.144 | 0.184 | | | | |
| 8 (F41) | Lens L4 | 2.457 | 0.546 | Glass | 1.743 | 49.3 | −22.47 |

TABLE 4-continued

| Surface | Element | Radius r0 | Thickness d | Material | Index | Abbe # | Focal length |
|---|---|---|---|---|---|---|---|
| 9 (F42) | | 1.937 | 0.184 | | | | |
| 10 | Top glass | Plano | 0.210 | Glass | 1.523 | 54.5 | |
| 11 | | Plano | 0.590 | | | | |
| 12 | Image | Plano | | Sensor | | | |

TABLE 5

| Surface | a4 | a6 | a8 | a10 |
|---|---|---|---|---|
| 2 (F11) | −0.075937186 | 0.054712247 | −0.073160234 | 0.051208664 |
| 3 (F12) | −0.24510218 | −0.36049224 | 0.91239014 | −1.254869 |
| 4 (F21) | −0.29531824 | 0.53305516 | −2.2321386 | 2.2734468 |
| 5 (F22) | 0.22392329 | −0.52272802 | 0.16748942 | 0.063541082 |
| 6 (F31) | 0.27432111 | −0.96865964 | 2.2034305 | −1.5438713 |
| 7 (F32) | 0.039573477 | 0.4435482 | −1.5793287 | 3.2461717 |
| 8 (F41) | −0.26565332 | 0.23303717 | −0.13924911 | 0.054903712 |
| 9 (F42) | −0.27380619 | 0.16252771 | −0.080990904 | 0.024674249 |

| Surface | a12 | a14 | a16 |
|---|---|---|---|
| 2 (F11) | −0.038024183 | 0 | 0 |
| 3 (F12) | 0.88357042 | −0.24509103 | 0 |
| 4 (F21) | −0.50546073 | −0.16841905 | 0 |
| 5 (F22) | 0.084928232 | 0 | 0 |
| 6 (F31) | 0.21758246 | 0 | 0 |
| 7 (F32) | −2.1376274 | −0.043280605 | 0.33521613 |
| 8 (F41) | −0.012826538 | 0.0012799542 | 0 |
| 9 (F42) | −0.004113719 | 0.0002384066 | 0 |

The wavefront aberration $W(p, A)$ is described in an analog manner to the first embodiment by a sum of Zernike Fringe polynomials $P_i$ with the corresponding coefficients $Z_i$ in accordance with Table 6.

TABLE 6

| | |
|---|---|
| Z 1 | 0.48647117 1 |
| Z 2 | 0.00000000 (p) * COS (A) |
| Z 3 | 0.00000000 (p) * SIN (A) |
| Z 4 | 0.51499558 (2p^2 − 1) |
| Z 5 | 0.00000000 (p^2) * COS (2A) |
| Z 6 | 0.00000000 (p^2) * SIN (2A) |
| Z 7 | 0.00000000 (3p^2 − 2) p * COS (A) |
| Z 8 | 0.00000000 (3p^2 − 2) p * SIN (A) |
| Z 9 | 0.43007385 (6p^4 − 6p^2 + 1) |
| Z 10 | 0.00000000 (p^3) * COS (3A) |
| Z 11 | 0.00000000 (p^3) * SIN (3A) |
| Z 12 | 0.00000000 (4p^2 − 3) p^2 * COS (2A) |
| Z 13 | 0.00000000 (4p^2 − 3) p^2 * SIN (2A) |
| Z 14 | 0.00000000 (10p^4 − 12p^2 + 3) p * COS (A) |
| Z 15 | 0.00000000 (10p^4 − 12p^2 + 3) p * SIN (A) |
| Z 16 | 0.20751425 (20p^6 − 30p^4 + 12p^2 − 1) |
| Z 17 | −0.00003308 (p^4) * COS (4A) |
| Z 18 | 0.00000000 (p^4) * SIN (4A) |
| Z 19 | 0.00000000 (5p^2 − 4) p^3 * COS (3A) |
| Z 20 | 0.00000000 (5p^2 − 4) p^3 * SIN (3A) |
| Z 21 | 0.00000000 (15p^4 − 20p^2 + 6) p^2 * COS (2A) |
| Z 22 | 0.00000000 (15p^4 − 20p^2 + 6) p^2 * SIN (2A) |
| Z 23 | 0.00000000 (35p^6 − 60p^4 + 30p^2 − 4) p * COS (A) |
| Z 24 | 0.00000000 (35p^6 − 60p^4 + 30p^2 − 4) p * SIN (A) |
| Z 25 | 0.14462009 (70p^8 − 140p^6 + 90p^4 − 20p^2 + 1) |
| Z 26 | 0.00000000 (p^5) * COS (5A) |
| Z 27 | 0.00000000 (p^5) * SIN (5A) |
| Z 28 | −0.00004471 (6p^2 − 5) p^4 * COS (4A) |
| Z 29 | 0.00000000 (6p^2 − 5) p^4 * SIN (4A) |
| Z 30 | 0.00000000 (21p^4 − 30p^2 + 10) p^3 * COS (3A) |
| Z 31 | 0.00000000 (21p^4 − 30p^2 + 10) p^3 * SIN (3A) |
| Z 32 | 0.00000000 (56p^6 − 105p^4 + 60p^2 − 10) p^2 * COS (2A) |
| Z 33 | 0.00000000 (56p^6 − 105p^4 + 60p^2 − 10) p^2 * SIN (2A) |
| Z 34 | 0.00000000 (126 p^8 − 280p^6 + 210p^4 − 60p^2 + 5) p * COS (A) |
| Z 35 | 0.00000000 (126 p^8 − 280p^6 + 210p^4 − 60p^2 + 5) p * SIN (A) |
| Z 36 | 0.16152218 (252p^10 − 630p^8 + 560p^6 − 210p^4 + 30p^2 − 1) |
| Z 37 | −0.15785051 (924p^12 − 2772p^10 + 3150p^8 − 1680p^6 + 420p^4 − 42p^2 + 1) |

The diagrams of FIGS. 6 and 7a to 7c show the transverse aberrations, the spherical aberration, the astigmatism, and the distortion in an analog manner to the diagrams of FIGS. 2 and 3a to 3c.

If a lens system in accordance with one of the two embodiments is to be used as an element of an imaging system, a corresponding image sensor, in particular a 3D image sensor, can be arranged in the image plane B.

The two embodiments explained above show two exemplary embodiments for a lens system in accordance with the invention in which the targeted introduction of spherical aberrations can be used to at least partly compensate an image blur caused by defocus to thereby obtain an acceptable image sharpness over a very large object distance zone. An imaging system of fixed focal length, in particular a 3D imaging system for use with 3D TOF image sensors, can be implemented with such a lens system that has a high lens speed, a large depth of field, and a compact design.

The exemplary lens systems are optimized for a wavelength range from 800 to 1000 nm. The calculation took place for a wavelength of 890 nm.

The structural data and the further parameters of the two embodiments of a lens system in accordance with the invention are only by way of example. It is understood that lens systems having different structural data and further parameters can also be covered by the present invention.

The f-number can be reduced by 21% with respect to known lens systems that have an f-number of 1.58 or higher with the aid of a lens system in accordance with the invention, in particular with the aid of a lens system in accordance with any one of the embodiments explained above. A lens system in accordance with the invention thus has 1.6 times more lens speed in comparison with a conventional lens system. The signal-to-noise ratio at the image sensor is improved by the increase in lens speed.

This can in particular be used to reduce the pixel size of the image sensor from 17.5 µm, such as is customary with conventional 3D imaging systems, to 14 µm so that a considerably more compact 3D image sensor can be used with respect to a conventional 3D imaging system. An imaging system can be implemented by the compact installation length of the lens system that can be shortened by up to 31% with respect to a conventional imaging system. The lens system in accordance with the invention is particularly suitable for installation in mobile devices such as cellphones or tablet computers.

REFERENCE NUMERAL LIST

A aperture diaphragm
B image plane

F11 surface of the first lens at the object side
F12 surface of the first lens at the image side
F21 surface of the second lens at the object side
F22 surface of the second lens at the image side
F31 surface of the third lens at the object side
F32 surface of the third lens at the image side
F41 surface of the fourth lens at the object side
F42 surface of the fourth lens at the image side
L installation length of the lens system
L1 first lens
L2 second lens
L3 third lens
L4 fourth lens
O object plane
OA optical axis
P planoparallel plate

The invention claimed is:

1. An optical lens system for a camera, the optical lens system comprising:
exactly four lenses, wherein the four lenses positioned from an object side to an image side comprise:
a first lens having a positive refractive power,
a second lens having a positive refractive power,
a third lens having a positive refractive power, and
a fourth lens having a negative refractive power;
wherein the second and third lenses are each meniscus lenses;
wherein a surface of the second lens at the object side is convex and a surface of the third lens at the object side is concave;
wherein a radius of curvature L2R1 of the surface of the second lens at the object side and a radius of curvature L3R2 of a surface of the third lens at the image side satisfy a condition $-1.4 < L2R1/L3R2 < -0.7$;
wherein a radius of curvature L2R2 of a surface of the second lens at the image side and a radius of curvature L3R1 of the surface of the third lens at the object side satisfy a condition $-1.8 < L2R2/L3R1 < -1.0$; and
wherein a focal length f4 of the fourth lens and a total focal length f of the optical lens system satisfy the condition $-12.0 < f4/f < -6.0$.

2. The optical lens system in accordance with claim 1, wherein each lens has at least one aspherically curved surface.

3. The optical lens system in accordance with claim 1, wherein the first lens is configured as a meniscus lens.

4. The optical lens system in accordance with claim 1, wherein the refractive power of the second lens is greater than the refractive power of the first and third lenses.

5. The optical lens system in accordance with claim 1, wherein the refractive power of the first lens is smaller than the refractive power of the second and third lenses.

6. The optical lens system in accordance with claim 1, wherein a focal length f1 of the first lens and the total focal length f of the optical lens system satisfy a condition $4.0 < f1/f < 6.5$.

7. The optical lens system in accordance with claim 1, wherein a focal length f2 of the second lens and the total focal length f of the optical lens system satisfy a condition $1.0 < f2/f < 2.0$.

8. The optical lens system in accordance with claim 1, wherein a focal length f3 of the third lens and the total focal length f of the optical lens system satisfy a condition $2.0 < f3/f < 3.5$.

9. The optical lens system in accordance with claim 1, wherein a common focal length f23 of the second and third lenses and the total focal length f of the optical lens system satisfy a condition $0.9 < f23/f < 1.3$.

10. The optical lens system in accordance with claim 1, wherein the surface of the first lens at the object side is convex.

11. The optical lens system in accordance with claim 1, wherein an installation length L and the total focal length f of the optical lens system satisfy a condition $L/f < 1.1$.

12. The optical lens system in accordance with claim 1, wherein all the four lenses are arranged at fixed spacings from one another.

13. The optical lens system in accordance with claim 1, wherein the optical lens system has spherical aberrations that are dimensioned such that they at least partly compensate a blur caused by defocus of an image of an object produced by the optical lens system.

14. The optical lens system in accordance with claim 1, wherein the optical lens system has a wavefront aberration $W(p, A)$ at a point of the exit pupil that is described by a sum of orthogonal Zernike Fringe polynomials $P_i(p, A)$ and associated coefficients $Z_i$ in the form $$W(p, A) = \sum_{i=1}^{37} Z_i \cdot P_i(p, A)$$

where p is the normed pupil height and A is the azimuthal angle;
where the defocus is described by the coefficient Z4 and the polynomial $2p^2-1$; the 3rd order spherical aberration by the coefficient Z9 and the polynomial $6p^4-6p^2+1$; the 5th order spherical aberration by the coefficient Z16 and the polynomial $20p^6-30p^4+12p^2-1$; the 7th order spherical aberration by the coefficient Z25 and the polynomial $70p^8-140p^6+90p^4-20p^2+1$; the 9th order spherical aberration by the coefficient Z36 and the polynomial $252p^{10}-630p^8+560p^6-210p^4+30p^2-1$; and the 11th order spherical aberration by the coefficient Z37 and the polynomial $924p^{12}-2772p^{10}+3150p^8-1680p^6+420p^4-42p^2+1$; and
where at least one of the conditions $$1.0 < \sqrt{Z9^2 + Z16^2 + Z25^2 + Z36^2 + Z37^2}/Z4 < 1.9$$

and $$0.35 < \sqrt{Z16^2 + Z25^2 + Z36^2 + Z37^2}/Z4 < 0.70$$

is satisfied.

15. The optical lens system in accordance with claim 1, wherein the radius of curvature L2R1 of the surface of the second lens at the object side and the radius of curvature L3R2 of the surface of the third lens at the image side satisfy the condition $-1.2 < L2R1/L3R2 < -0.8$, and the radius of curvature L2R2 of the surface of the second lens at the image side and the radius of curvature L3R1 of the surface of the third lens at the object side satisfy the condition $-1.6 < L2R2/L3R1 < -1.2$.

16. An imaging system, comprising:
an image sensor having a plurality of light-sensitive elements arranged in rows and columns;
an optical lens system, the optical lens system comprising exactly four lenses, wherein the four lenses positioned from an object side to an image side comprise:
a first lens having a positive refractive power,
a second lens having a positive refractive power, a third lens having a positive refractive power, and
a fourth lens having a negative refractive power;
wherein the second and third lenses are each meniscus lenses;
wherein a surface of the second lens at the object side is convex and a surface of the third lens at the object side is concave;
wherein a radius of curvature L2R1 of the surface of the second lens at the object side and a radius of curvature L3R2 of a surface of the third lens at the image side satisfy a condition $-1.4 < L2R1/L3R2 < -0.7$;
wherein a radius of curvature L2R2 of a surface of the second lens at the image side and a radius of curvature L3R1 of the surface of the third lens at the object side satisfy a condition $-1.8 < L2R2/L3R1 < -1.0$; and
wherein a focal length f4 of the fourth lens and a total focal length f of the optical lens system satisfy the condition $-12.0 < f4/f < -6.0$.

17. The imaging system in accordance with claim 16, wherein the spacing between the image sensor and the optical lens system is unchangeable.

18. The imaging system in accordance with claim 16, wherein the optical lens system has spherical aberrations that are dimensioned respective to a surface of a light-sensitive element of the image sensor such that the spherical aberrations compensate a blur caused by defocus of an image of an object produced by the optical lens system such that the surface of a light spot that is generated by imaging a beam of rays emanating from an object point on the image sensor within a predefined object distance zone is substantially no larger than the surface of the light-sensitive element.

* * * * *